(12) United States Patent
Teo et al.

(10) Patent No.: US 11,105,906 B2
(45) Date of Patent: Aug. 31, 2021

(54) SONAR-INTEGRATED INTERNET OF THINGS DEVICE AND APPLICABLE SPATIAL ENVIRONMENT DETECTION SYSTEM THEREOF

(71) Applicant: Espressif Systems (Shanghai) Co., Ltd., Shanghai (CN)

(72) Inventors: Swee Ann Teo, Shanghai (CN); Rui Zhan, Shanghai (CN)

(73) Assignee: Espressif Systems (Shanghai) Co., Ltd., Shanghai (CN)

( * ) Notice: Subject to any disclaimer, the term of this patent is extended or adjusted under 35 U.S.C. 154(b) by 344 days.

(21) Appl. No.: 16/083,767

(22) PCT Filed: Dec. 16, 2016

(86) PCT No.: PCT/CN2016/110412
§ 371 (c)(1),
(2) Date: Sep. 10, 2018

(87) PCT Pub. No.: WO2018/032673
PCT Pub. Date: Feb. 22, 2018

(65) Prior Publication Data
US 2020/0166619 A1    May 28, 2020

(30) Foreign Application Priority Data
Aug. 19, 2016 (CN) .......................... 201610689419.1

(51) Int. Cl.
| | | |
|---|---|---|
| *G01S 7/52* | (2006.01) | |
| *G01S 15/87* | (2006.01) | |
| *H04L 29/08* | (2006.01) | |

(52) U.S. Cl.
CPC .......... *G01S 7/52003* (2013.01); *G01S 15/87* (2013.01); *H04L 67/10* (2013.01); *H04L 67/12* (2013.01)

(58) Field of Classification Search
CPC ...... G01S 7/52003; G01S 15/87; G01S 7/003; G01S 15/88; H04L 67/10; H04L 67/12; H04W 4/70; H04W 4/38
See application file for complete search history.

(56) References Cited

U.S. PATENT DOCUMENTS

| 10,693,714 B2 * | 6/2020 | Teo ........................... H04L 9/12 |
| 2015/0085602 A1 * | 3/2015 | Lebedev ................. G01S 15/96 |
| | | 367/3 |

(Continued)

FOREIGN PATENT DOCUMENTS

| CN | 101191836 A | 6/2008 |
| CN | 202077194 U | 12/2011 |

(Continued)

OTHER PUBLICATIONS

The Research of Monitoring Technology on Shoreline and Water Quality of Lake Based on IOT, Wang, Weihu.

*Primary Examiner* — Daniel Pihulic
(74) *Attorney, Agent, or Firm* — Reinhart Boerner Van Deuren P.C.

(57) ABSTRACT

A sonar-integrated IoT device, the IoT device including one or more sonar sensor modules (101), corresponding to information acquisition in different spatial directions; the IoT device is in communication connection with an external signal processing unit through a wireless network, and sends unprocessed or preliminarily processed spatial information to the signal processing unit. The advantages of the invention include: simple and flexible arrangement of sonar sensor module (101) nodes, which are integrated with wireless IoT devices such that spatial information may be acquired locally; and at the same time, ease of implementation of large interval arrangement and large quantity arrangement of sonar sensor modules (101), covering a variety of spatial locations, thereby providing wide coverage (Continued)

of spatial detection range, and acquisition of abundant signal samples, such that better spatial information extraction algorithms may be implemented in the signal processing unit.

11 Claims, 3 Drawing Sheets

(56) References Cited

U.S. PATENT DOCUMENTS

| | | | |
|---|---|---|---|
| 2015/0120045 A1 | 4/2015 | Tan et al. | |
| 2016/0026729 A1 | 1/2016 | Gil et al. | |
| 2018/0159728 A1* | 6/2018 | Teo | ............... H04L 63/0428 |
| 2019/0116418 A1* | 4/2019 | Teo | ............... H04R 5/027 |
| 2020/0166619 A1* | 5/2020 | Teo | ............... G01S 15/88 |

FOREIGN PATENT DOCUMENTS

| | | | | |
|---|---|---|---|---|
| CN | 202512439 U | | 10/2012 | |
| CN | 202904016 U | | 4/2013 | |
| CN | 103475979 A | | 12/2013 | |
| CN | 103593891 U | | 2/2014 | |
| CN | 103971220 A | | 8/2014 | |
| CN | 104075072 A | | 10/2014 | |
| CN | 105376531 A | | 3/2016 | |
| CN | 105447459 A | | 3/2016 | |
| CN | 106199611 A | * | 12/2016 | ............ G01S 15/88 |
| CN | 106199611 A | | 12/2016 | |
| CN | 206178139 U | * | 5/2017 | |
| CN | 206178139 U | | 5/2017 | |
| CN | 106199611 B | * | 4/2020 | ............ H04W 4/70 |
| WO | WO-2018032673 A1 | * | 2/2018 | ............ G01S 7/003 |

\* cited by examiner

SONAR-INTEGRATED INTERNET OF THINGS DEVICE AND APPLICABLE SPATIAL ENVIRONMENT DETECTION SYSTEM THEREOF

TECHNICAL FIELD

The present invention relates to the technical field of spatial environment monitoring, and particularly relates to a sonar-integrated Internet of Things (IoT) device and applicable spatial environment detection system thereof.

BACKGROUND ART

With the development of wireless communication technologies and expansion of their ranges of application, IoT technologies and device have also achieved high speed development. An IoT device may be various information sensors and controllers, and it may also be various intelligent home appliances. IoT devices access the internet in various ways to form a vast network, realizing the extension of the internet form people to things.

Usually a certain wireless connection technology is followed among IoT devices to achieve interconnections. 802.11 Wi-Fi wireless communication standard is one of the most widely used wireless access technology standards nowadays, and in the field of IoT, Wi-Fi IoT access is one of the ways for IoT access with the widest range of application, lowest cost, and best scalability.

At the same time, artificial intelligence technologies are also developing rapidly, and when artificial intelligence technologies are combined with IoT technologies to form an intelligent IoT, an IoT device may be required to sense the environment where it locates, for the environmental information including temperature, humidity, light, and spatial environment conditions.

Simple local information, such as temperature, humidity, and light, may be obtained by arranging temperature, humidity, and light sensors on the IoT device. In contrast, spatial environment information, as key environment information, has to be obtained in a complicated manner, which usually requires selecting suitable type of technologies and implementation details according to space-filling medium, size of spatial range and particular requirements for an application.

Commonly used spatial detection technologies for obtaining spatial environment information include wireless electric radar detection and optical radar detection, but due to relatively limited power of IoT devices, simple application scenarios, relatively small range of application range (as compared with large wireless electric radars and other means), variety of media in application space (gas, liquid, and etc.), the above described spatial detection technologies lack universal applicability and adaptability.

SUMMARY OF THE INVENTION

An object of the present invention is to provide a sonar-integrated IoT device and applicable spatial environment detection system thereof, which may, in application scenarios that require detection of information about a spatial environment where the IoT device locates, utilize the sonar on the IoT device to perform spatial detection, and may perform spatial environment information analysis locally, and/or may utilize a wireless connection of the IoT device to send the acquired spatial environment information to a more powerful information processing device, so as to perform more detailed spatial environment information processing and analysis.

In order to achieve the above described object, the present invention provides the following technical solution:

a sonar-integrated IoT device, wherein the IoT device includes one or more sonar sensor modules, corresponding to information acquisition in different spatial directions.

The above described sonar-integrated IoT device may further comprise:

a wireless transmission and control module, an input end of which is in communication connection with the sonar sensor module, and an output end of which is in communication connection with an external signal processing unit through a wireless network, wherein the wireless transmission and control module sends unprocessed or preliminarily processed spatial information to the signal processing unit through wireless network communication.

In the above described sonar-integrated IoT device, the IoT device may further include a basic function module.

In the above described sonar-integrated IoT device, the basic function module may be any application function device.

In the above described sonar-integrated IoT device, the sonar sensor module may be an ultrasonic band sonar sensor, or formed by an audible sound band sound device, a sound acquisition device and a spatial detection signal processing module collectively, or is a sensor system combining the above described two bands.

A spatial environment detection system is provided, which comprises:

one or more sonar-integrated IoT devices arranged in a spatial environment in a distributed manner, for information acquisition in different spatial directions.

A spatial environment detection system is provided, which comprises:

a signal processing unit, which is in wireless communication connection with the sonar-integrated IoT device, and receives the unprocessed or preliminarily processed spatial information sent by the IoT device;

the signal processing unit is a standalone device in a wireless network or is integrated with an access point in the wireless network.

The above described spatial environment detection system may further comprise:

a function device, which is in connection with the signal processing unit;

wherein the sonar sensor module sends the acquired spatial information to the signal processing unit through the wireless network, and the signal processing unit controls the function device according to a result of parsing the spatial information.

In the above described spatial environment detection system, the spatial environment detection system may further include a monitoring device. As compared with existing technologies, the present invention may provide the following advantages: simple and flexible arrangement of sonar sensor nodes, which are integrated with wireless IoT devices such that spatial information may be acquired locally; and at the same time, ease of implementation of large interval arrangement and large quantity arrangement of sonar sensors, covering a variety of spatial locations, thereby providing wide coverage of spatial detection range, and acquisition of abundant signal samples, such that better spatial information extraction algorithms may be implemented in the signal processing unit.

DETAILED DESCRIPTION OF THE EMBODIMENTS

With reference to the drawings, the present invention will be further described in the following through the detailed description of a preferred particular embodiment.

A sonar-integrated IoT device may include one or more sonar sensor modules 101; the sonar sensor module 101 has the functions of transmitting a sound wave detection signal, and acquiring reflected detection signals in the space, corresponding to information acquisition in different spatial directions; the IoT device is in communication connection with an external signal processing unit through a wireless network, and sends unprocessed or preliminarily processed spatial information to the signal processing unit. The above described sonar-integrated IoT device may utilize mechanical waves, such as audible sound waves or ultrasonic waves, to perform spatial detection and obstacle detection by detecting the propagation of sound waves in a medium space and reflected waves from obstacles in the space; in particular, the IoT device detects and acquires spatial signals through sonar sensor module 101, and may perform spatial information extraction on the acquired signal, and/or may also send the acquired signals or preliminarily processed spatial information to a higher level processing unit through a wireless connection, so as to perform more detailed spatial information analysis and processing, or meet the signal processing requirements of other applications; that is to say, locally performed spatial environment information analysis and utilization is achieved, and it also achieves the function of sending the acquired spatial environment information to a more powerful information processing device for more complicated analysis, such as detailed spatial environment information processing or spatial modelling. In other words, the IoT device of the present invention may, depending on the particular application requirements, possess different spatial detection signal processing analysis capabilities in a range from simple to complicated: for example, some IoT devices may need to process and analyze spatial environment information locally, so as to cooperate with other function module application (e.g., as in the first embodiment), while some IoT devices do not need the function of local processing, and they only need to transmit the acquired spatial detection information to a signal processing unit in the wireless network (e.g., the second and third embodiments).

The IoT device may further include a wireless transmission and control module 103 and a basic function module 102, wherein an input end of the wireless transmission and control module 103 is in communication connection with the sonar sensor module 101, and an output end thereof is in wireless network communication connection with the signal processing unit; and the basic function module 102 is in communication connection with the wireless transmission and control module 103.

Figure 1:
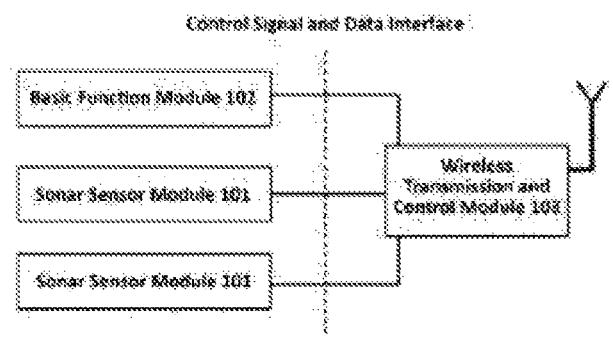
FIG. 1 is an illustrative structural diagram of a sonar-integrated IoT device according to the present invention.

The basic function module 102 may be any application function device, such as home appliance control, illumination control, other data acquisition and processing, etc.; FIG. 1 shows an embodiment of a sonar-integrated IoT device according to the present invention; the IoT device may include two sonar sensor modules 101 (e.g., corresponding to acquisition in different spatial directions); a basic function module 102 and the sonar sensor modules 101 are all in connection with a wireless transmission and control module 103 through a control signal and data interface; the illustrated control signal and data interface may be a standard interface, such as UART, SPI, I2S, USB, SDIO, I2C, etc., or may be a non-standard privately defined interface.

The sonar-integrated IoT device may be formed by combining a wireless device supporting other application function, an IoT device, etc., plus a sonar sensor module, e.g., a Wi-Fi light group device plus a sonar sensor module, a Wi-Fi home IoT device plus a sonar sensor module, etc., or may be an IoT node having only the function of sonar spatial detection.

The sonar sensor module 101 may be an ultrasonic band sonar sensor, or formed by an audible sound band sound device, a sound acquisition device and a spatial detection signal processing module collectively or is a sensor system combining the above described two bands. An operating frequency of the above described sonar sensor may be in a higher frequency band of audible sound wave, e.g., 7 kHz to 20 kHz, or may also be in an ultrasonic band. For a sonar detection system, if the sonar detection frequency is lower, the detectable spatial range would be larger, and detection accuracy would be lower; and if the frequency is higher, the detectable spatial range would be smaller, and the detect accuracy would be higher.

In the present embodiment, the wireless network may be in any wireless network transmission mode; currently, 802.11 Wi-Fi wireless communication standard is one of wireless access technology standards with the widest application ranges; in the field of IoT, Wi-Fi IoT access is one of the ways for IoT access with the widest range of application, lowest cost, and best scalability; and the examples described in the present invention are mainly Wi-Fi networks.

The present invention further discloses a spatial environment detection system, which comprises:

a signal processing unit, which is in wireless communication connection with the sonar-integrated IoT device, and receives the unprocessed or preliminarily processed spatial information sent by the IoT device. The signal processing unit may be a standalone device in a wireless network or is integrated with an access point in the wireless network, e.g., an access point (AP) in a Wi-Fi wireless network may be integrated with the signal processing unit. The above described signal processing unit is mainly responsible for performing signal processing, such as spatial information extraction, on its received spatial detection signal acquired by various sonar sensor nodes, so as to meet the requirements of various real time and non-real time applications. From the acquired spatial detection signals, the signal processing unit may extract spatial distance information, obstacle position information, indoor spatial range, even surface material information of indoor furniture or items, etc.; particularly, the module function may be flexibly implemented with software.

The spatial environment detection system may further comprise:

a function device, wherein the IoT device parses and uses spatial information acquired by the sonar sensor module 101, and controls the function device in a wired or wireless manner according to a result of parsing.

The spatial environment detection system may further comprise:

a function device, which is in connection with the signal processing unit; the sonar sensor module 101 sends the acquired spatial information to the signal processing unit through the wireless network, and the signal processing unit controls the function device according to a result of parsing the spatial information.

The spatial environment detection system may further include a monitoring device.

The First Embodiment

Figure 2:
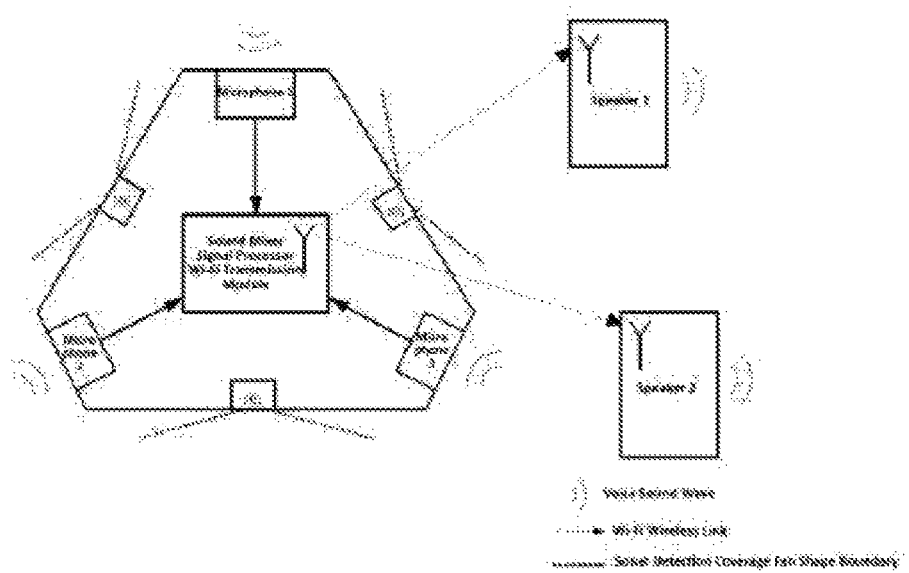
FIG. 2 is a system diagram of a first embodiment of a spatial environment detection system based on a sonar-integrated IoT device according to the present invention.

FIG. 2 shows a commonly seen Wi-Fi based desktop array microphone; in the present embodiment, an IoT device is embedded with three microphones, three sonar sensors 101, a sound mixer and signal processing module and Wi-Fi transmission module. When the device starts operating, the three embedded sonar sensors 101 detect 360° two-dimensional spatial information of the plane where the device locates through, and the signal processor performs spatial environment information extraction. The three microphones are used to acquire sound signals in the space where the device locates. The spatial environment information is used to assist the sound mixer in performing voice signal extraction and processing sound information acquired by the microphone array of the three microphones. In the present embodiment, the Wi-Fi link is only used to send the voice information extracted by the sound mixer to the speaker for replay, while the spatial information obtained by the system does not need to be transmitted through the Wi-Fi wireless link.

The Second Embodiment

Figure 3:
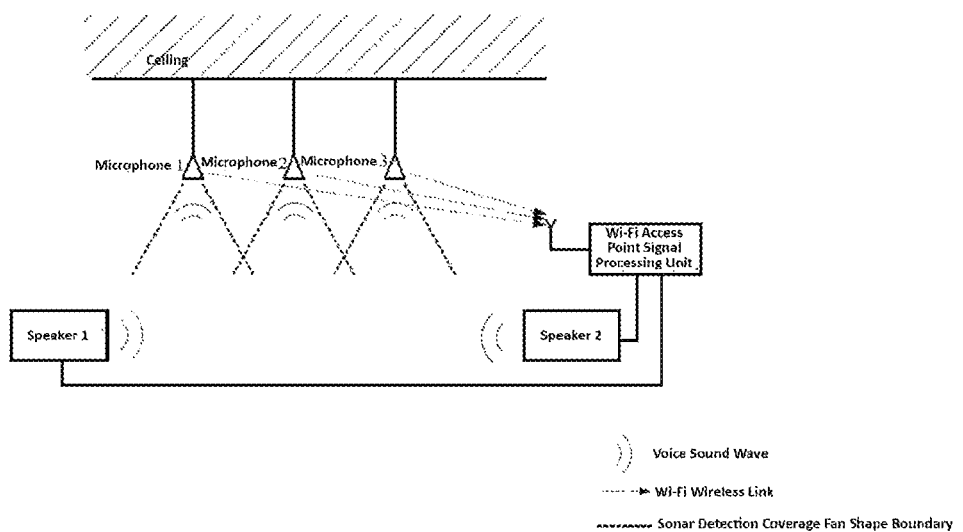
FIG. 3 is a system diagram of a second embodiment of a spatial environment detection system based on a sonar-integrated IoT device according to the present invention.

FIG. 3 shows a Wi-Fi wireless suspended microphone array; each of the Wi-Fi wireless suspended microphone is embedded with a sonar sensor 101. The device does not perform any signal processing; sound information acquired by the microphone and spatial detection information acquired by the sonar sensor 101 are both transmitted to a Wi-Fi access point through respective Wi-Fi link; and a signal processing unit extracts spatial environment information and performs other voice signal separation and extraction. Like the first embodiment, the spatial information acquired by the device the present embodiment may also be used to assist the signal processing unit in performing voice signal processing.

The Third Embodiment

Figure 4:
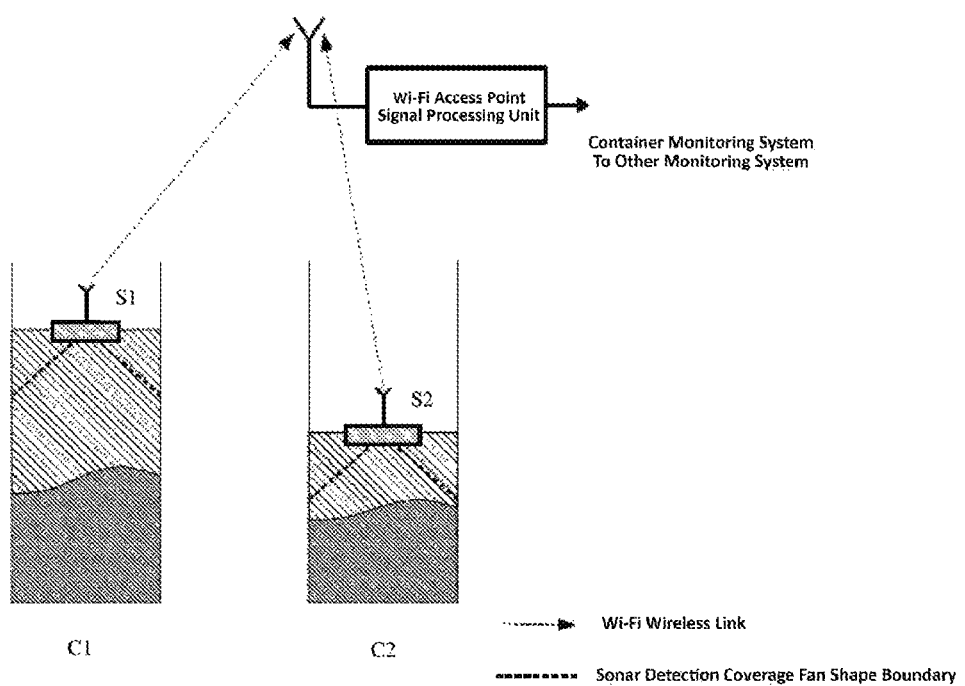
FIG. 4 is a system diagram of a third embodiment of a spatial environment detection system based on a sonar-integrated IoT device according to the present invention.

FIG. 4 shows an industrial IoT application, specifically a Wi-Fi wireless automatic monitoring system for liquid container, which is used to monitor a liquid volume in the container, and a form of sediment in the bottom of the liquid. In the figure, C1 and C2 represent two liquid containers for storing a certain liquid, the hatched portions represent liquid portions, and the gray portions at the bottom represent sediments in the containers. In the figure, S1 and S2 represents two floating Wi-Fi wireless IoT monitoring devices with a sonar sensor 101 (not shown) arranged at a bottom of each IoT device; the sonar sensor 101 is periodically operated to vertically send sound wave signals into the liquid within a fan-shaped range, and receive reflected signals from the bottom. In the present embodiment, the two floating monitoring devices S1 and S2 may not perform any processing of the detection signal, but send the received detection signal to an access point through a wireless link to the Wi-Fi access point, and space monitoring information will be processed by a signal processing unit on the access point device; alternatively, a part of the spatial information extraction may be performed on the floating monitoring devices S1 and S2, and preliminarily processed results may be sent to a signal processing unit on the Wi-Fi access point for synthesized processing. A finally obtained depth of the liquid portion in the container and a surface form information of the sediments at the bottom of the liquid will be provided to the monitoring system for synthesized management of the storage of the container. If a vertical wall of the container is marked with scale indicia, then a camera may also be provided on the IoT monitoring device, such that when the sonar sensor 101 is scanning the bottom, the camera may be utilized to read indicia information for the liquid level in the container, so as to facilitate the monitoring system in monitoring a thickness of the sediments at the bottom of the liquid.

Although the disclosure of the present invention is described in detail through the above described preferred embodiments, it will be understood that the above described content shall not be considered as limitations to the present invention. Upon reviewing the above described disclosure, various modifications and substitutions to the present invention will be apparent to a person of ordinary skills in the art. Thus, the scope of protection of the present invention shall be defined by the appending claims.

The invention claimed is:

1. A spatial environment detection system, comprising:
one or more sonar-integrated IoT devices arranged in a spatial environment in a distributed manner, for information acquisition in different spatial directions, wherein each of said one or more sonar-integrated IoT devices includes one or more sonar sensor modules (101), corresponding to information acquisition in different spatial directions;
a function device, wherein each of said one or more sonar-integrated IoT devices parses and uses spatial information acquired by the one or more sonar sensor modules (101), and controls the function device in a wired or wireless manner according to a result of parsing.

2. A spatial environment detection system, comprising:
one or more sonar-integrated IoT devices arranged in a spatial environment in a distributed manner, for information acquisition in different spatial directions, wherein each of said one or more sonar-integrated IoT devices includes one or more sonar sensor modules (101), corresponding to information acquisition in different spatial directions;
a signal processing unit, which is in wireless communication connection with said one or more sonar-integrated IoT devices, and receives the unprocessed or preliminarily processed spatial information sent by the one or more sonar-integrated IoT devices, wherein said signal processing unit is a standalone device in a wireless network or is integrated with an access point in the wireless network; and
a function device, which is in connection with said signal processing unit;

wherein each of said one or more sonar sensor modules (101) sends the acquired spatial information to the signal processing unit through the wireless network, and the signal processing unit controls the function device according to a result of parsing the spatial information.

3. The spatial environment detection system according to claim 2, wherein said spatial environment detection system further includes a monitoring device.

4. The spatial environment detection system according to claim 1, wherein each of said one or more sonar-integrated IoT devices further comprises:
a wireless transmission and control module (103), an input end of which is in communication connection with each of the one or more sonar sensor modules (101), and an output end of which is in communication connection with an external signal processing unit through a wireless network, wherein the wireless transmission and control module (103) sends unprocessed or preliminarily processed spatial information to the signal processing unit through wireless network communication.

5. The spatial environment detection system according to claim 1, wherein each of said one or more sonar-integrated IoT devices further includes a basic function module (102).

6. The spatial environment detection system according to claim 5, wherein said basic function module (102) is any application function device.

7. The spatial environment detection system according to claim 1, wherein each of said one or more sonar sensor modules (101) is an ultrasonic band sonar sensor, or formed by an audible sound band sound device, a sound acquisition device and a spatial detection signal processing module collectively, or is a sensor system combining the above described two bands.

8. The spatial environment detection system according to claim 2, wherein each of said one or more sonar-integrated IoT devices further comprises:
a wireless transmission and control module (103), an input end of which is in communication connection with each of the one or more sonar sensor modules (101), and an output end of which is in communication connection with an external signal processing unit through a wireless network, wherein the wireless transmission and control module (103) sends unprocessed or preliminarily processed spatial information to the signal processing unit through wireless network communication.

9. The spatial environment detection system according to claim 2, wherein each of said one or more sonar-integrated IoT devices further includes a basic function module (102).

10. The spatial environment detection system according to claim 9, wherein said basic function module (102) is any application function device.

11. The spatial environment detection system according to claim 2, wherein each of said one or more sonar sensor modules (101) is an ultrasonic band sonar sensor, or formed by an audible sound band sound device, a sound acquisition device and a spatial detection signal processing module collectively, or is a sensor system combining the above described two bands.

* * * * *